Patented May 28, 1935

2,003,065

UNITED STATES PATENT OFFICE 2,003,065

COMPOSITION FOR COATING SHEETS, FIBROUS STOCKS, AND THE LIKE

Charles M. Boyce, Cedar Rapids, Iowa, assignor to John R. Ditmars, New York, N. Y.

No Drawing. Application June 20, 1931,
Serial No. 545,832

8 Claims. (Cl. 91—67.9)

The present invention relates to the coating of surfaces of fibrous stocks, such as paper, board, wood, or the like, to impart a desirable surface finish thereto, and to compositions for use in connection therewith. The invention is particularly applicable in the case of such bases having imprinted surfaces, to accentuate the brilliance, detail and depth of tone of such imprints. The solutions and coating compositions here involved may be applied by any suitable means, for example, by the methods and apparatus shown in my prior Patents Nos. 1,719,796, granted July 2, 1929, and 1,725,699, granted August 20, 1929.

In carrying out the present invention, I apply to the surface of the sheet of paper, cardboard, or other fibrous stock, which may be suitably ink-imprinted, if desired, a composition capable of forming a transparent film and containing casein in solution, or preferably both casein and gelatin.

In preparing a composition in accordance with the present invention, I employ as a solvent liquid either water alone, or preferably water containing alcohol, such as ethyl or methyl alcohol, to facilitate evaporation of the solvent, the quantity thereof being proportioned to avoid precipitation of constituents of the bath. For example, if desired, up to 25 to 27% of alcohol may be employed, and in general I prefer to employ from 15 to 25%.

The solvent is rendered alkaline by any suitable alkali, preferably by means of ammonia, the proportion employed depending upon the proportion of casein which is used. Thus, from 5 to 10 ounces of casein may be employed to each 100 ounces of the aqueous solvent, from 2½ to 5% of commercial aqua-ammonia having been previously introduced thereinto. A proportion of hardening agent, such as formaldehyde, hexamethylenetetramine, or the like, is incorporated in excess of the amount which would congeal the solution or harden or condense the gelatin and protein constituents thereof in about four minutes, and also a flexibility imparting or retarding agent, such as glycerine, sulfonated oil, or the like, in proportion to greatly delay or retard the hardening or condensing action.

The following example illustrates the preparation of a composition in accordance with the present invention:

A composition is prepared containing, to each 100 ounces of water (or of a mixture of alcohol and water containing from 15 to 27% alcohol) rendered alkaline, as by the addition of 2.25 to 3 ounces of aqua ammonia, 5 ounces of gelatin, 6 ounces of casein, 2 ounces of formaldehyde and 5 to 7 ounces of glycerine. In preparing the solution, a part of the water, say about one-third, is taken, the casein added thereto, and the ammonia then added and the casein dissolved. Another portion of the water, suitably one-fourth to one-third, is used to dissolve the gelatin. The glycerine and formaldehyde may be added to either the casein or gelatin solution, or preferably, they may be divided and a part added to each. The resulting solutions are mixed, and the remaining water and alcohol added thereto. Varying proportions of gelatin are incorporated into the composition, suitably from 4 to 8 ounces to each 100 ounces of the solvent.

In the formulas prepared in accordance with the present invention, the proportion of the formaldehyde employed may vary, depending upon the proportion and characteristics of the gelatin employed, and other suitable hardening agents, such as hexamethylenetetramine, alum, or the like, may be employed in its place. The proportion of hardening agent, in formulas such as are above described, may vary, say from one-half to ten ounces per 100 ounces of vehicle, and in each case such that, in the absence of the flexibility imparting and retarding agent, the gelatin would be condensed or hardened to a substantially insoluble state or the solution congealed in an ordinary working period, or even less time, say as short as four minutes. In place of glycerine, other flexibility-imparting agents, such as sulfonated oils, may be substituted in whole or in part, the proportion of the softening or flexibility-imparting agent ranging from 3 to 10 ounces per 100 ounces of vehicle. The flexibility-imparting agent delays or retards the hardening or condensing of the gelatin, and prevents the rapid congelation of the solution which would otherwise occur.

In using the composition of the present invention, it is kept at a uniform temperature for facilitating application, say at 100 to 120° F., the alcohol in the composition, when it is added, improving the flowing properties of the solution and increasing the rate of evaporation of the liquid. It may be applied to the paper or base, preferably bearing an ink-impression, by any suitable means, as by rollers, by complete or partial immersion, or the like.

After the solution has been applied, it may be dried, forming a transparent film which greatly improves the depth of tone, detail and brilliance of the ink-imprints upon the base treated. The consistency of the solution is modified, in accordance with the character of the base, to secure the desired surface finish. Thus the above formula will impart to ordinary paper stock a lustrous finish, and by decreasing the consistency and thereby the depth or thickness of the film formed, for example, by diluting the solution, matte or semi-matte finishes may be secured.

In order to impart a gloss or enamel to the treated surface, the coated base, after drying, may be superficially treated with water, or water and alcohol, made slightly alkaline with ammonia if desired, and then forced into intimate contact with a highly polished surface of metal, glass, or the like, and dried thereupon; or, if desired, after partial drying of the coated base after the initial coating thereof, the film-bearing surface may be forced into close and intimate contact with a highly polished surface and dried in contact therewith. A highly glazed or enameled superficial finish is thereby secured.

By the use of the composition as hereinbefore described, the surface characteristics of the paper or other fibrous base may be modified and improved. The brilliance, detail and depth of tone of ink impressions thereupon are materially enhanced while securing a uniform surface over both the printed and unprinted portions of the base, ranging from semi-matte or matte to gloss; and at the same time, in the case of impressions from line cuts, half-tone blocks and the like, a marked photographic effect is imparted.

I claim:

1. The method of modifying the surface characteristics of a paper or similar base bearing an ink impression which comprises applying thereto a transparent film-forming solution containing casein and gelatin in an aqueous vehicle, controlling the consistency of said solution to secure a desired depth of film over the base and the ink impression thereupon to secure the desired uniform surface finish.

2. The method of modifying the surface of a fibrous base bearing an ink impression which comprises forming thereupon a transparent film containing casein and gelatin with a hardening agent and a flexibility-imparting agent in proportion to retard its hardening action in the presence of a solvent, and drying said film in contact with a polished surface.

3. The method of modifying the surface of a base of fibrous stock bearing an ink impression which comprises applying thereto a transparent film-forming solution containing gelatin and casein in an alkaline aqueous vehicle with a hardening agent and a flexibility-imparting agent in proportion to retard its hardening action, drying said film, applying a treating liquid superficially thereto, forcing the film into contact with a polished surface and drying it thereon, whereby a uniform gloss is imparted over the base and the ink imprints thereon.

4. The method of modifying the surface of a fibrous base bearing an ink impression which comprises forming thereupon a transparent film containing casein and gelatin with a hardening agent and a flexibility-imparting agent in proportion to retard its hardening action in the presence of a solvent, drying said film, superficially moistening said film, and drying said film in contact with a polished surface.

5. An ink-imprinted coated paper comprising a paper base, and a transparent coating in the form of a flexible film on the surface thereof, the coating including a gelatin, casein, a hardening agent and a flexibility-imparting agent, and the surface of the film being polished.

6. A coated paper comprising a paper base, a polished flexible coating comprising a film containing gelatin, casein, a hardening agent, and a flexibility-imparting agent, and a colored surface coating for said base and covered by the material of said film, whereby said colored coating is made conspicuous by reason of said film.

7. A coated paper comprising a paper base, a colored coating covering at least a portion of the surface of said base and a flexible film covering said coating and base and containing gelatin, casein, a hardening agent, and a flexibility-imparting agent, and the surface of the film being polished.

8. The method of modifying the surface characteristics of a paper or similar base which comprises applying a colored coating to modify the color characteristics of the surface and a film-forming solution containing casein and gelatin in an aqueous vehicle, controlling the consistency of said solution to secure a desired depth of film over the base and colored coating and polishing the surface of the film.

CHARLES M. BOYCE.